United States Patent
Kiyota et al.

(10) Patent No.: US 9,707,992 B2
(45) Date of Patent: Jul. 18, 2017

(54) WORM WHEEL AND ELECTRIC POWER STEERING APPARATUS

(71) Applicant: NSK Ltd., Tokyo (JP)

(72) Inventors: Haruhiko Kiyota, Gunma (JP); Takeshi Yamamoto, Gunma (JP); Fumiaki Mitsuhashi, Gunma (JP); Kentaro Ogi, Gunma (JP)

(73) Assignee: NSK LTD., Tokyo (JP)

( * ) Notice: Subject to any disclaimer, the term of this patent is extended or adjusted under 35 U.S.C. 154(b) by 37 days.

(21) Appl. No.: 14/239,893

(22) PCT Filed: Oct. 24, 2012

(86) PCT No.: PCT/JP2012/077515
§ 371 (c)(1),
(2) Date: Feb. 20, 2014

(87) PCT Pub. No.: WO2013/084613
PCT Pub. Date: Jun. 13, 2013

(65) Prior Publication Data
US 2015/0129348 A1 May 14, 2015

(30) Foreign Application Priority Data
Dec. 7, 2011 (JP) ................................. 2011-267850

(51) Int. Cl.
*B62D 5/04* (2006.01)
*F16H 55/22* (2006.01)
*F16H 55/06* (2006.01)

(52) U.S. Cl.
CPC ......... *B62D 5/0454* (2013.01); *B62D 5/0409* (2013.01); *F16H 55/06* (2013.01);
(Continued)

(58) Field of Classification Search
CPC ................................. B62D 5/0454; B62D 5/04
(Continued)

(56) References Cited

U.S. PATENT DOCUMENTS 3,461,738 A * 8/1969 Pandjiris ................. B23P 15/14
29/527.2
5,307,705 A * 5/1994 Fenelon ................... B29C 70/84
264/242

(Continued)

FOREIGN PATENT DOCUMENTS

JP 11301501 11/1999
JP 2000095120 4/2000
(Continued)

OTHER PUBLICATIONS

International Search Report and Written Opinion dated Dec. 11, 2012, from the corresponding PCT/JP2012/077515.
(Continued)

*Primary Examiner* — Kevin Hurley
*Assistant Examiner* — Gabriela C Craciun
(74) *Attorney, Agent, or Firm* — Katten Muchin Rosenman LLP

(57) ABSTRACT

Worm wheel construction that is able to sufficiently increase the strength of the connecting portion between a hub 11a and a gear portion 12a, and to maintain sufficient durability even when applied to an electric power steering apparatus that applies a large auxiliary torque, is achieved.
A synthetic resin gear portion 12a is molded and formed in the end portion on the outer-diameter side of a metal hub 11a. A first annular concave portion 15 is provided on one surface side in the axial direction of the hub 11a, and a second annular concave portion 22 is provided on the other surface side in the axial direction thereof. Part of the synthetic resin of the gear portion 12a is fed into the portions
(Continued)

near the outer diameter of the first annular concave portion 15 and the second annular concave portion 22 to form a first restraining portion 18 and a second restraining portion 23. These restraining portions 18, 23 tightly hold the end portion on the outer-diameter side of the hub 11a, and improve the strength and rigidity of the connecting portion between the hub 11a and the gear portion 12a.

11 Claims, 12 Drawing Sheets

(52) U.S. Cl.
CPC ....... *F16H 55/22* (2013.01); *F16H 2055/065* (2013.01); *Y10T 74/19921* (2015.01)

(58) Field of Classification Search
USPC ......... 74/439, 443, 446, 425, 89.14, 388 PS, 74/DIG. 10
See application file for complete search history.

(56) References Cited

U.S. PATENT DOCUMENTS

| | | | | |
|---|---|---|---|---|
| 5,722,295 | A * | 3/1998 | Sakai | F16H 55/06 264/101 |
| 6,425,455 | B1 * | 7/2002 | Kurokawa | B62D 5/0409 180/444 |
| 6,497,041 | B2 * | 12/2002 | Fujita | B29C 45/0055 264/138 |
| 6,622,814 | B2 * | 9/2003 | Kurokawa | B62D 5/0409 180/444 |
| 6,644,431 | B2 * | 11/2003 | Kuze | B62D 5/0409 180/444 |
| 6,761,244 | B2 * | 7/2004 | Sano | B62D 5/0409 180/444 |
| 8,100,026 | B2 * | 1/2012 | Suzuki | B29C 45/0046 74/434 |
| 8,794,096 | B2 * | 8/2014 | Oberle | B29C 45/0055 74/443 |
| 2002/0043124 | A1 * | 4/2002 | Shiga | B29C 45/16 74/434 |
| 2002/0056588 | A1 * | 5/2002 | Kuze | B62D 5/0409 180/444 |
| 2002/0112555 | A1 * | 8/2002 | Chikaraishi | B62D 5/0409 74/388 PS |
| 2004/0083610 | A1 * | 5/2004 | Kuze | B62D 5/0409 29/893.34 |
| 2004/0241276 | A1 * | 12/2004 | Miyasaka | B29C 45/0025 425/543 |
| 2005/0247151 | A1 * | 11/2005 | Yamamoto | B29C 45/14065 74/425 |
| 2013/0220050 | A1 * | 8/2013 | Koike | A01K 89/00 74/439 |
| 2015/0354687 | A1 * | 12/2015 | Kiyota | F16H 55/22 180/444 |

FOREIGN PATENT DOCUMENTS

| | | |
|---|---|---|
| JP | 2001206230 | 7/2001 |
| JP | 2003021223 | 1/2003 |
| JP | 2004034941 | 2/2004 |
| JP | 2004345573 | 12/2004 |
| JP | 2006022883 | 1/2006 |
| JP | 2006-194296 A | 7/2006 |
| JP | 2008183940 | 8/2008 |
| WO | 2007037499 | 4/2007 |

OTHER PUBLICATIONS

Chinese Office Action, dated Jun. 13, 2016 for the Corresponding Chinese Patent Application No. 201280001654.5.

* cited by examiner

US 9,707,992 B2

WORM WHEEL AND ELECTRIC POWER STEERING APPARATUS

TECHNICAL FIELD

The present invention relates to a worm wheel that constitutes a worm speed reducer, and an electric power steering apparatus in which this worm wheel is assembled.

BACKGROUND ART

As an apparatus for reducing the force required for operating the steering wheel when applying a steering angle to steered wheels of an automobile (normally the front wheels except in special vehicles such as a fork lift or the like), an electric power steering apparatus that uses an electric motor as an auxiliary power source are widely used. Although various constructions for an electric power steering apparatus are known, an auxiliary power from an electric motor is applied by way of a speed reducer to a rotating shaft that is rotated by the steering wheel operation in any of such constructions. Normally, a worm speed reducer is used as this kind of speed reducer. An electric power steering apparatus that uses a worm speed reducer can transmit an auxiliary power from an electric motor to a rotating shaft by engaging a worm that is rotated and driven by the electric motor with a worm wheel that rotates together with a rotating shaft.

FIGS. 9 and 10 illustrate an example of a conventional electric power steering apparatus. The front end portion of a steering shaft 2 that is rotated by a steering wheel 1 is freely rotatably supported on the inside of a housing 3, and a worm wheel 4 is fastened to a portion that is rotated and driven by the steering shaft 2. A warm 7 is connected to an output shaft 6 of an electric motor 5. An auxiliary torque having a specific size in a specific direction can be applied from the electric motor 5 to the warm wheel 4 by engaging the worm 7 with the worm wheel 4.

While operating this kind of electric power steering apparatus, direction and amount of electric current to the electric motor is controlled based on the direction and size of the torque that is applied to the steering shaft 2 from the steering wheel 1. A suitable auxiliary torque is then applied to the steering shaft 2 by way of the worm 7 and worm wheel 4. Thus, the torque that is transmitted to a steering gear unit 9 by way of an intermediate shaft 8 becomes larger than the torque that is inputted from the steering shaft 2. Accordingly, a pair of left and right tie rods 10 can be pushed or pulled by a larger force than the operation force that is applied to the steering wheel 1, so that a desired steering angle can be applied to a pair of left and right steered wheels with small operation force.

A worm wheel having composite construction combining a metal hub and synthetic resin gear portion as disclosed in JPH 11-301501 (A), JP 2001-206230 (A), JP2004-034941 (A), JP2004-345573 (A), and JP2006-022883 (A) is widely known as a worm wheel 4 that constitutes a speed reducer for an electric power steering apparatus. That is, the portion that is fitted around and fastened to the steering shaft is composed of a metal circular ring-shaped hub, and the portion that engages with a worm is composed of a synthetic gear portion. By making the gear portion using a synthetic resin, it becomes easier to form teeth around the outer circumferential surface of the worm wheel so that the manufacturing cost can be reduced. Moreover, gear rattle noise that occurs in the engagement portion between the worm wheel and the worm can also be reduced. FIG. 11 illustrates a worm wheel 4a having the construction that is disclosed in JP2004-034941 (A), and FIG. 12 illustrates a main part of an electric power steering apparatus in which the worm wheel 4a is assembled.

The worm wheel 4a comprises a hub 11 and a gear portion 12. The hub 11 is formed into a circular ring shape being made of metal such as a copper alloy or ferrous alloy. An circular installation hole 14 for fitting and fastening the hub 11 onto an output shaft 13 is provided in the center portion of the hub 11, an annular concave portion 15 that is recessed in the axial direction is provided in a portion that is near the inner diameter rather than the outer circumferential edge portion on one surface in the axial direction of the hub 11, and a spline portion 16 having concave and convex portions formed in the circumferential direction is provided on the outer circumferential surface of the outer circumferential edge portion of the hub 11.

In the meantime, a gear portion 12 is made of a synthetic resin such as polyamide resin, polyacetal resin in which reinforced fiber such as carbon fiber or glass fiber is mixed, and worm wheel teeth 17 are provided around the outer circumferential surface thereof. The gear portion 12 is formed by feeding a synthetic resin into a circular ring-shaped cavity that is formed between the portion near the outer diameter of the hub 11 and the inner surface of a mold with the hub 11 being set in the mold. When feeding, the synthetic resin is fed into the cavity from a ring gate that is located on the other surface in the axial direction of the hub 11 (right surface in FIGS. 11 and 12), and molded to cover the outer circumferential edge portion of the hub 11 around the entire circumference. Of the synthetic resin that forms the gear portion 12, the portion that corresponds to the inner circumferential edge portion of the gear portion 12 that is located on one surface side in the axial direction of the hub 11 fills the portion near the outer diameter of the annular concave portion 15 and forms a restraining portion 18. Further, the synthetic resin also fills concave portions of the spline portion 16, and connects the hub 11 and the gear portion 12 such that torque can be transmitted. Furthermore, when removing the synthetic resin from the portion that is connected to the ring gate, the portion near the outer diameter is left to become a second restraining portion 19. Because of this construction, the hub 11 and gear portion 12 are firmly connected. After taking out of the hub 11 and gear portion 12 from the mold, grinding as a finishing process is performed on the worm wheel teeth 17 of the outer circumferential surface of the gear portion 12.

As illustrated in FIG. 12, this kind of worm wheel 4a is fitted around and fastened to an output shaft 13 of an electric power steering apparatus. The output shaft 13 and the steering shaft 2 that is rotated and driven by the steering wheel 1 (see FIG. 9) are connected by a torsion bar 20. Moreover, a torque sensor 21 is provided on the inner surface of the housing 3 so as to be able to measure the torque that is transmitted between the steering shaft 2 and the output shaft 13. Based on the measured value of the torque, current flows to an electric motor 5, and an auxiliary torque is applied to the output shaft 13 by way of the worm wheel 4a. Because the construction and function of this kind of electric power steering apparatus as a whole are conventionally known widely, a detailed explanation thereof will be omitted.

An electric power steering apparatus is more used in comparatively large automobiles in recent years, and thus an auxiliary torque that is applied to the output shaft 13 by way of the worm wheel 4a tends to become large. When applying an auxiliary torque to the output shaft 13 by way of the worm wheel 4a, a moment M in the falling direction as illustrated by the arrow in FIG. 11 is applied to the worm wheel 4a from the gear engagement portion between the worm wheel 4a and the worm 7 (see FIG. 10). In the case of the worm wheel 4a illustrated in FIGS. 11 and 12, the strength of the connecting portion between the hub 11 and the gear portion 12 is not necessarily strong enough for this moment M. That is, durability may not be sufficiently maintained when this kind of construction is applied to an electric power steering apparatus that applies a large auxiliary torque.

RELATED LITERATURE

Patent Literature

[Patent Literature 1] JPH 11-301501 (A)
[Patent Literature 2] JP 2001-206230 (A)
[Patent Literature 3] JP2004-034941 (A)
[Patent Literature 4] JP2004-345573 (A)
[Patent Literature 5] JP2006-022883 (A)

SUMMARY OF INVENTION

Problem to be Solved by Invention

Taking the above situation into consideration, the present invention aims to achieve a warm wheel construction that is formed by combining a metal hub and a synthetic resin gear portion, in which the strength of the connecting portion between the hub and gear portion can be sufficiently increased, and the durability can be maintained even when applied to an electric power steering apparatus that applies a large auxiliary torque.

Means for Solving Problems

The worm wheel of the present invention comprises a metal hub and a synthetic resin gear portion. The hub has an installation hole in the center portion thereof for a rotating shaft to be fitted and fastened thereinto. Moreover, a first annular concave portion is provided in a portion near the inner diameter rather than the outer circumferential edge on one surface in the axial direction of the hub, and concave and convex portions in the circumferential direction are provided around the outer circumferential edge portion thereof.

The gear portion is molded by molding a synthetic resin that is injected from a ring gate that is provided on the other surface side in the axial direction of the hub to cover the entire circumference of the end portion on the outer-diameter side of the hub. The inner circumferential edge portion of the gear portion that is on the one surface side in the axial direction of the hub enters into a portion near the outer diameter of the first annular concave portion.

In the case of the worm wheel of the present invention, a second annular concave portion is formed in the circumferential direction at a portion near the outer diameter of the hub. Part of the synthetic resin that forms the gear portion is also fed into the second annular concave portion.

In one embodiment of the present invention, the second annular concave portion is formed on the other surface in the axial direction of the hub. The circumferential surfaces on the inner-diameter side and the outer-diameter side of the second annular concave portion are inclined in a direction such that the width dimension in the radial direction of the second annular concave portion becomes larger toward the opening portion of the other surface side in the axial direction of the hub. Furthermore, the portion near the outer diameter and the portion near the inner diameter rather than the second annular concave portion of the other surface in the axial direction of the hub are on the same plane.

In another embodiment of the present invention, the second annular concave portion is formed so as to be further concave from the inner surface of the portion near the outer diameter of the first annular concave portion. In this case, it is preferable that the second annular concave portion is formed so as to be concave outward in the radial direction from the circumferential surface on the outer-diameter side of the inner surface of the first annular concave portion, or the second annular concave portion is formed so as to be concave in the axial direction from the bottom surface in the axial direction of the inner surface of the first annular concave portion.

In another embodiment of the present invention, the cross-sectional shape of the second annular concave portion can be various shapes such as rectangular, semicircular, U-shaped and the like. However, it is preferable that the cross-sectional shape of the second annular concave portion is V-shaped with the width dimension thereof becoming smaller toward the rear portion.

The electric power steering apparatus of the present invention comprises a housing, a rotating shaft, a worm wheel, and an electric motor. The housing is supported by a stationary portion and does not rotate. Further, the rotating shaft is rotatably provided with respect to the housing, and is rotated by a steering wheel so as to apply a steering angle to steered wheels accompanied with the rotation. The worm wheel is supported inside the housing by part of the rotating shaft so as to be concentric with the rotating shaft, and to rotate together with the rotating shaft. The worm comprises a worm shaft and worm teeth that are provided in the middle portion in the axial direction of the worm shaft, and the worm is rotatably supported by the housing in a state that the worm teeth are geared with the worm wheel. Furthermore, the electric motor is supported by and fastened to the housing to rotate and drive the worm. In the electric power steering apparatus of the present invention in particular, the worm wheel is constituted by the worm wheel of the present invention.

Effect of Invention

The strength of the connecting portion between the hub and the gear portion can be sufficiently increased with the worm wheel of the present invention. In other words, because the hub and gear portion engage at two locations at the first annular concave portion and the second annular concave portion, the strength and rigidity of the connecting portion is increased so that damages such as loosening at the connecting portion can be prevented even when a large moment is applied between the hub and the gear portion. This is why the durability of a worm speed reducer can be sufficiently maintained even when applied to an electric power steering apparatus that applies a large auxiliary torque.

MODES FOR CARRYING OUT INVENTION

First Example

Figure 1:
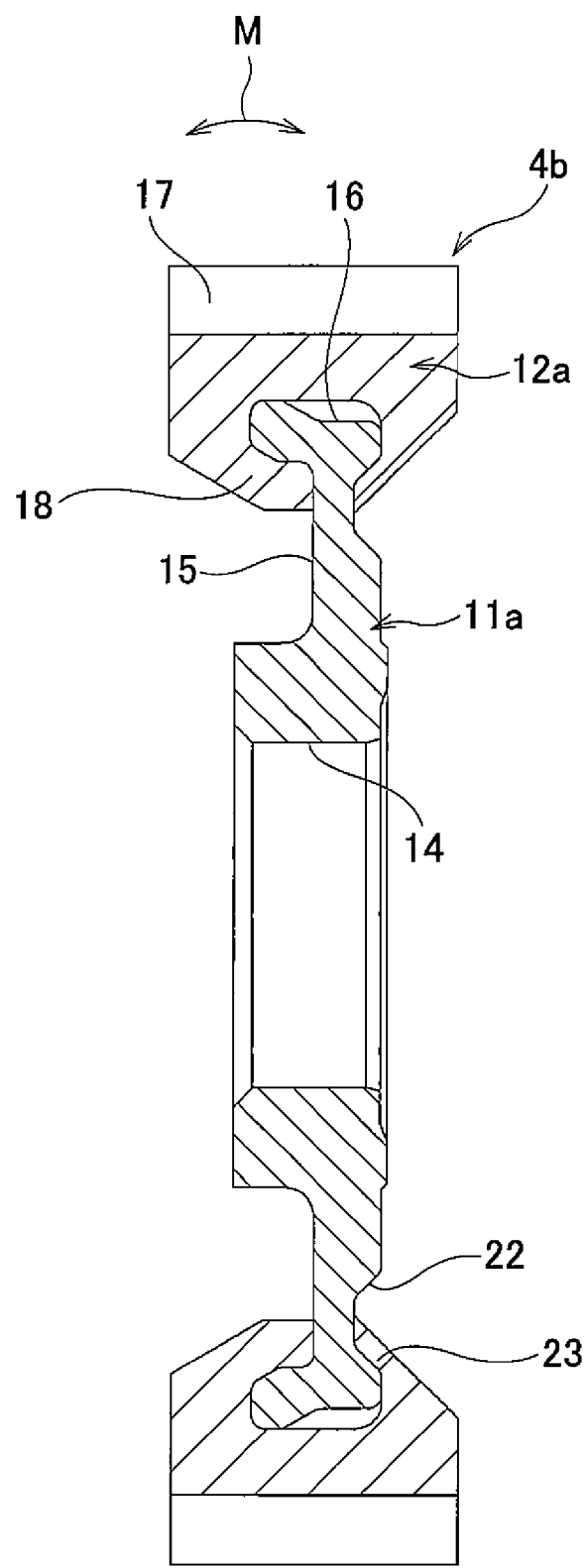
FIG. 1 is a cross-sectional view illustrating a worm wheel of a first example of an embodiment of the present invention.
Figure 2:
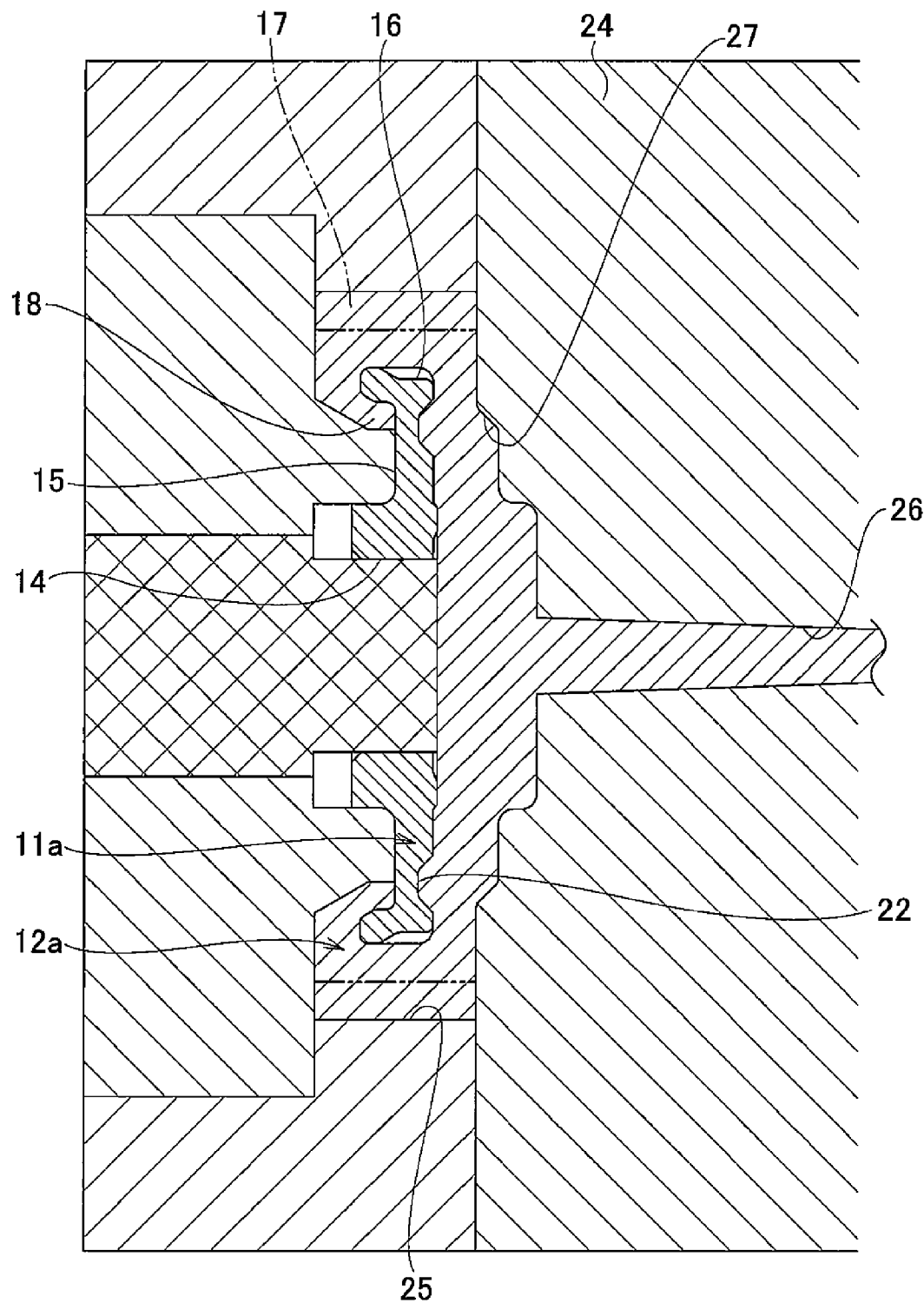
FIG. 2 is a cross-sectional view illustrating the worm wheel and gear portion of the first example being molded by injection.
Figure 3:
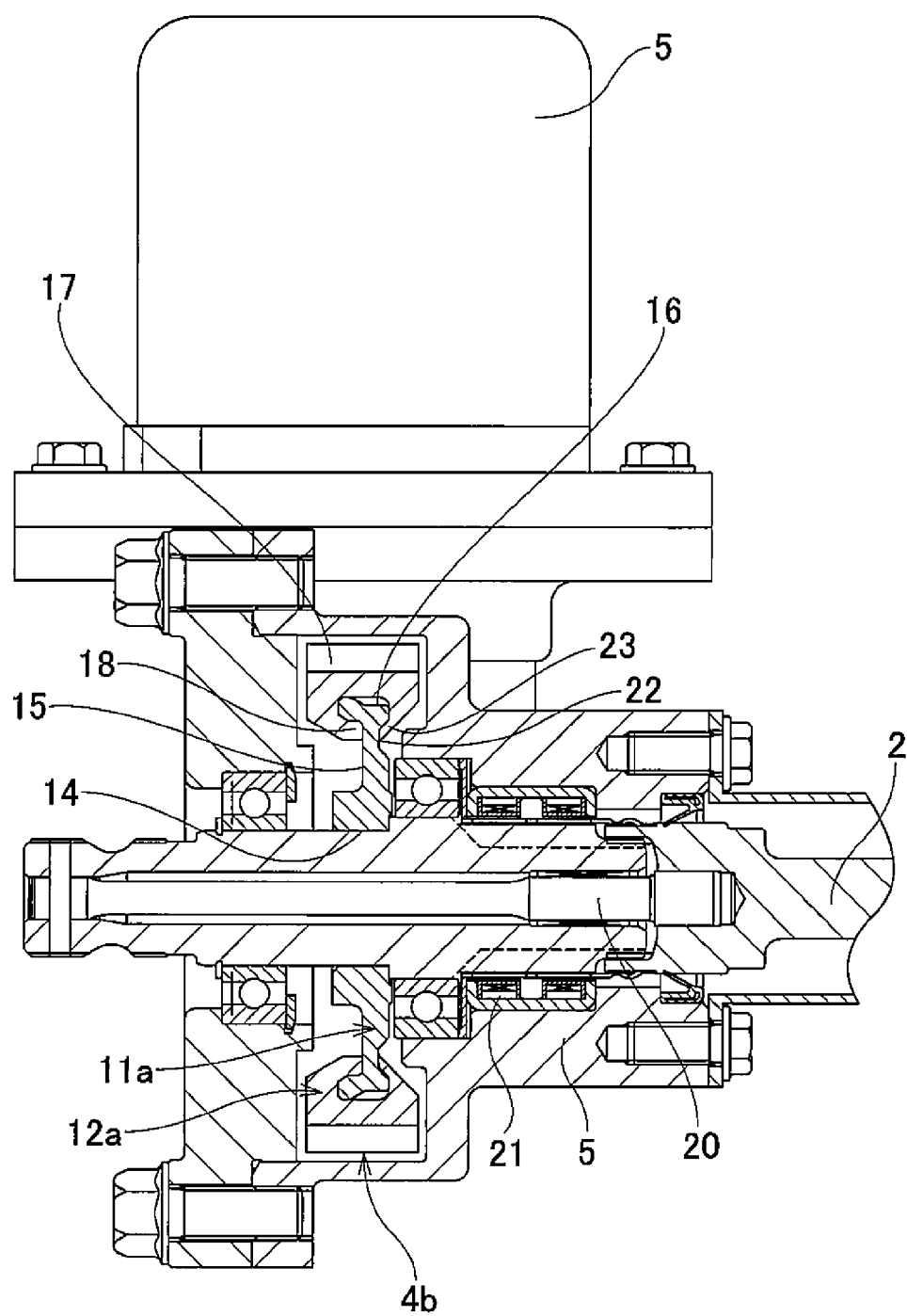
FIG. 3 is a cross-sectional view illustrating a main part of an electric power steering apparatus in which the worm wheel of the first example is assembled.
Figure 11:
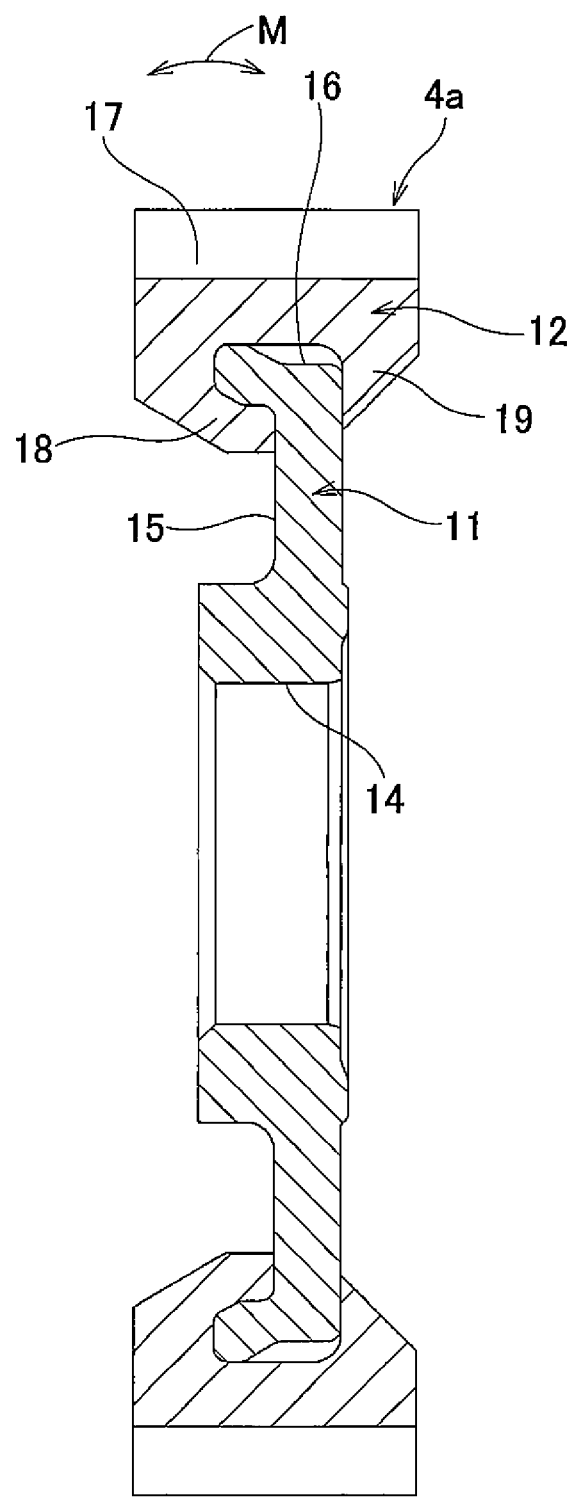
FIG. 11 is a cross-sectional view illustrating a worm wheel of an example having conventional construction.
Figure 12:
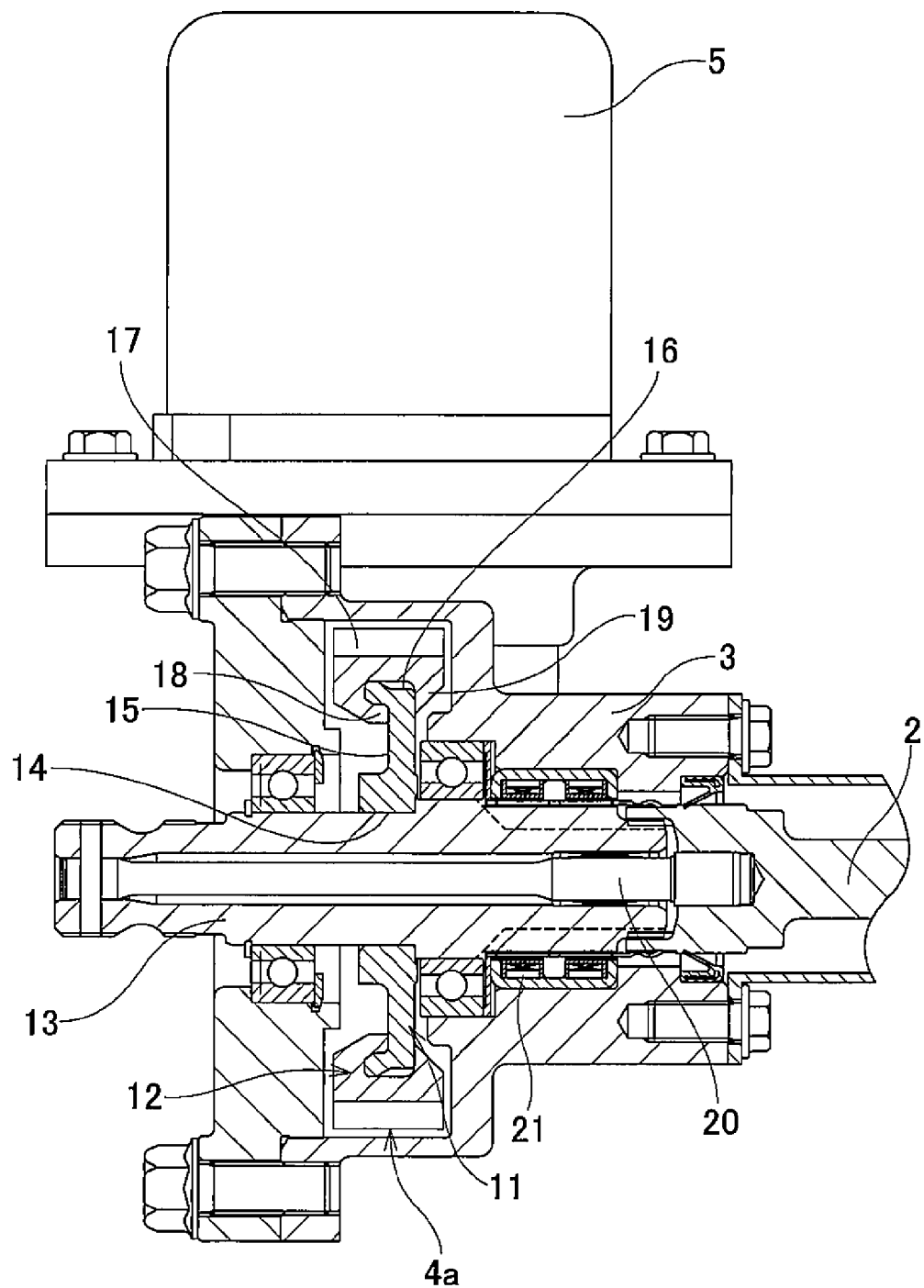
FIG. 12 is a cross-sectional view of a main part of an electric power steering apparatus in which the worm wheel illustrated in FIG. 11 is assembled.

FIG. 1 to FIG. 3 illustrate a first example of an embodiment of the present invention. This example is characterized in the improved construction of a connecting portion between a metal hub 11a and a synthetic resin gear portion 12a that constitute a composite worm wheel 4b in order to increase the strength and rigidity of the connecting portion. The construction and function of other parts correspond to that of the worm wheel having the construction illustrated in FIGS. 11 and 12. Therefore, the same reference numbers will be used for corresponding parts, and any redundant explanation will be omitted or simplified, such that the following explanation focuses on the features of this example.

In the construction of this example, in addition to a first annular concave portion 15 that is provided on one surface in the axial direction of the hub 11a (left surface in FIG. 1 to FIG. 3), a second annular concave portion 22 is formed on the other surface in the axial direction of the hub 11a (right surface in FIG. 1 to FIG. 3). The width dimension in the radial direction of this second annular concave portion 22 is smaller than that of the first annular concave portion 15. Specifically, the positions of end portions on the outer-diameter side of the first annular concave portion 15 and the second annular concave portion 22 roughly match, and an end portion on the inner-diameter side of the second annular concave portion 22 is located in nearly the middle portion in the radial direction of the first annular concave portion 15. Usually, the first annular concave portion 15 is formed entirely in the circumferential direction on the one surface in the axial direction of the hub 11a, and the second annular concave portion 22 is also formed entirely in the circumferential direction on the other surface in the axial direction of the hub 11a. However, these concave portions 15, 22 also include a shape partially breaking the continuity thereof in the circumferential direction.

In this example, in addition to forming a first restraining portion 18 that is continuous around the entire circumference by filling part of the synthetic resin forming the gear portion 12a that is located on the one surface side in the axial direction of the hub 11a into the first annular concave portion 15, a second restraining portion 23 that is continuous around the entire circumference is formed by filling part of the synthetic resin forming the gear portion 12a that is located on the other surface side in the axial direction of the hub 11a inside the second annular concave portion 22. The first restraining portion 18 and the second restraining portion 23 form the inner circumferential edge portions of the gear portion 12a.

With the construction of the worm wheel 4b of this example, the gear portion 12a holds the outer circumferential edges (end portion on the outer-diameter side) of the hub 11a from the outer-circumferential surface side and the inner-circumferential surface side on both sides in the axial direction thereof. As a result, the strength and rigidity of the connecting portion between the hub 11a and the gear portion 12a cab be sufficiently increased. In other words, the hub 11a and the gear portion 12a are engaged around the entire circumference at two locations; the engaging portions between the first annular concave portion 15 and the first restraining portion 18 and between the second annular concave portion 22 and the second restraining portion 23. Therefore, the strength and rigidity of the connecting portion between the hub 11a and the gear portion 12a is increased, and even when a large moment M shown as an arrow in FIG. 1 is applied in either direction between the hub 11a and the gear portion 12a, damages such as loosening at the connecting portion between the hub 11a and the gear portion 12a can be prevented. That is, as shown in FIG. 3, even when an electric power steering apparatus that applies a large auxiliary torque is constructed using a worm speed reducer that includes the worm wheel 4a, the durability of the worm speed reducer and the electric power steering apparatus is sufficiently maintained.

In the case of the construction of this example, the circumferential surface (end portion) on the inner-diameter side and the circumferential surface (end portion) on the outer-diameter side of the second annular concave portion 22 are inclined surfaces that are inclined in a direction such that the width direction in the radial direction of the second annular concave portion 22 becomes larger going toward the opening portion on the other surface side in the axial direction of the hub 11a. Further, of the other surface in the axial direction of the hub 11a, the portion near the outer diameter and the portion near the inner diameter than the second annular concave portion 22 are on the same plane. Thus, the gear portion 12a having good quality can be obtained because the molten resin flows smoothly inside the cavity of the mold apparatus 24 when the gear portion 12 is molded by injection. This will be explained with reference to FIG. 2. Molten resin is fed into the cavity 25 through a sprue 26 and disk gate 27 that are provided in the mold apparatus 24. When feeding, the molten resin flows along the other surface in the axial direction of the hub 11a from the inner-diameter side to the outer-diameter side, and part of the resin fills inside the second annular concave portion 22. Because the circumferential surface on the inner-diameter side and the circumferential surface on the outer-diameter side of the second annular concave portion 22 are inclined and, the portion near the outer diameter and the portion near the inner diameter rather than the second annular concave portion are on the same plane, the molten resin fills the portion of the cavity 25 that forms the main portion of the gear portion 12*a* without turbulence. Moreover, the molten resin that is fed into the cavity 25 reaches a portion that corresponds to the first restraining portion 18 and then stops. No molten resin that is fed from other directions comes in contact with the molten resin in this portion. Therefore, a weldline with low strength will not be formed in the gear portion 12*a* that is obtained from injection molding. The synthetic resin that is then cooled and hardened inside the cavity 25, and the worm wheel 4*b* as illustrated in FIGS. 1 and 3 is obtained by opening the mold apparatus 24, separating a plurality of molds from each other, and cutting the synthetic resin around the entire circumference in the middle portion in the radial direction of the second annular concave portion 22.

Second Example

Figure 4:
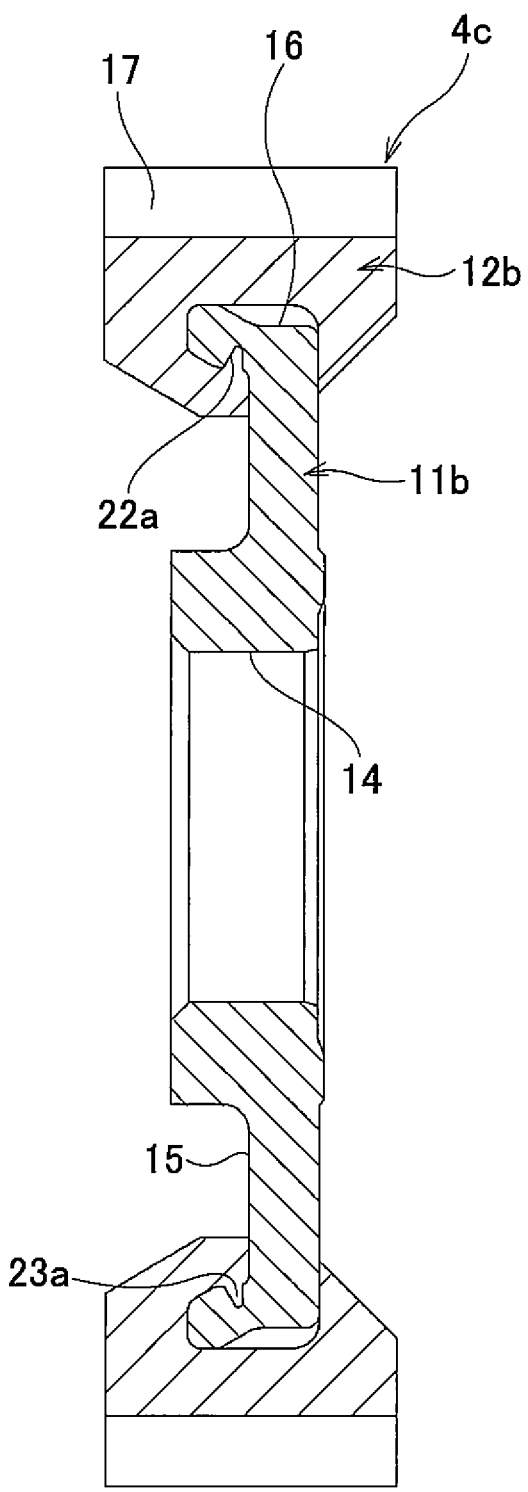
FIG. 4 is a cross-sectional view illustrating a worm wheel of a second example of an embodiment of the present invention.
Figure 5:
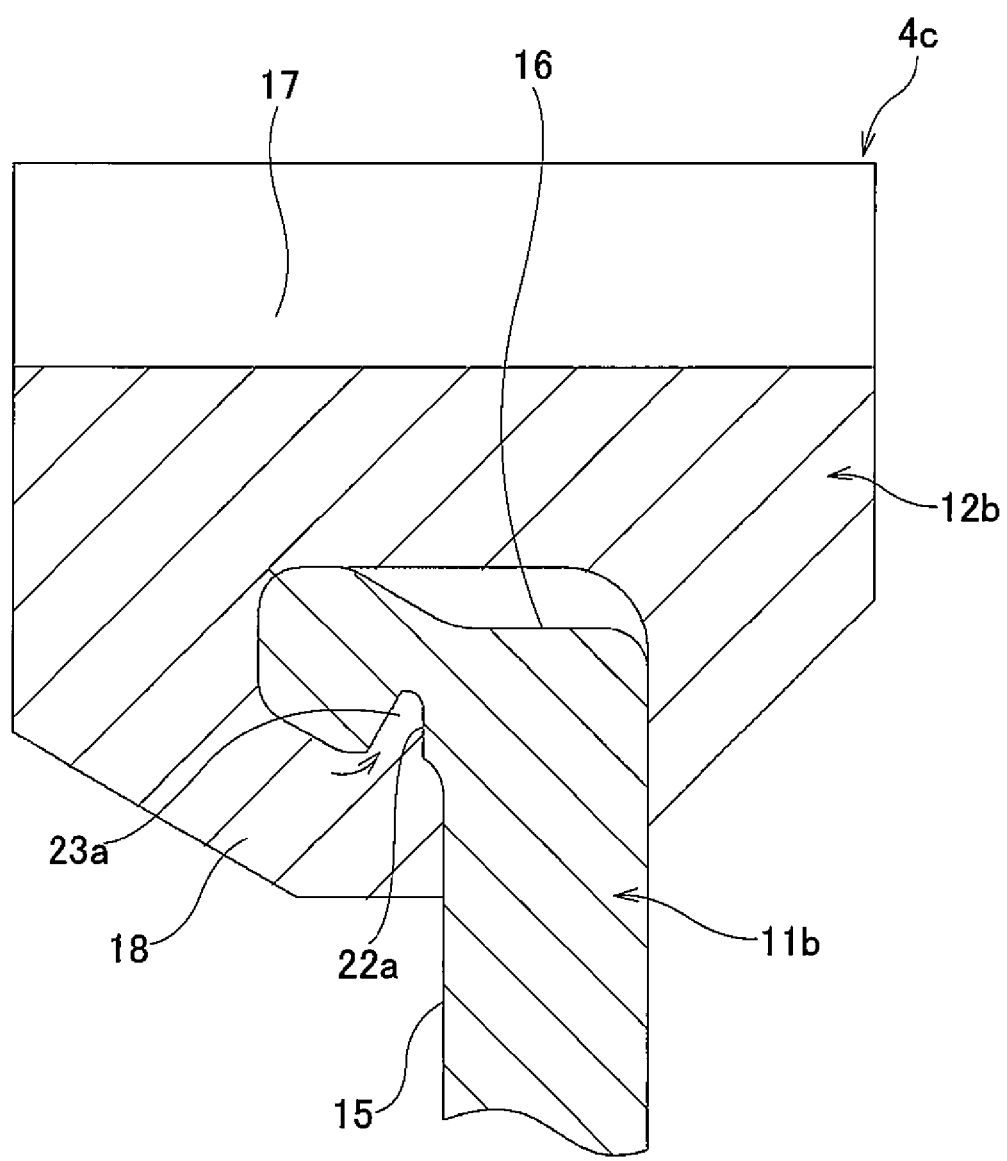
FIG. 5 is an enlarged view illustrating a connecting portion between a hub and gear portion of the worm wheel of the second example.

FIGS. 4 and 5 illustrate a second example of an embodiment of the present invention. In the worm wheel 4*c* of this example, a second annular concave portion 22*a* is formed so as to be concave further outward in the radial direction from the circumferential surface on the outer-diameter side of the inner surface of a first annular concave portion 15. Moreover, the second annular concave portion 22*a* is formed as an annular concave groove having a V-shaped cross portion, the width dimension thereof becoming smaller toward the rear portion.

In the construction of this example as well, part of the synthetic resin forming the gear portion 12*b* fills inside the second annular concave portion 22*a* (annular concave groove) to form an engagement portion. Thus, based on the engagement portion between the second annular concave portion 22*a* and the second restraining portion 23*a* that is formed by the synthetic resin cooled and hardened inside the second annular concave portion 22*a*, the strength and rigidity against a moment in FIG. 5 that acts in the counterclockwise direction on the gear portion 12*b* is increased. Regarding a moment in the opposite direction, sufficient strength and rigidity is maintained based on the engagement between the first restraining portion 18 and the outer circumferential edge portion (end portion on the outer-diameter side) of the hub 11*b*. Accordingly, the strength and rigidity of the connecting portion between the hub 11*b* and the gear portion 12*b* can be increased against a moment that acts in either direction. Moreover, a weldline that is disadvantageous in maintaining the strength of the connecting portion will not be formed when the gear portion 12*b* is molded by injection, because the molten resin is fed into the second annular concave portion 22*a* at last.

Third Example

Figure 6:
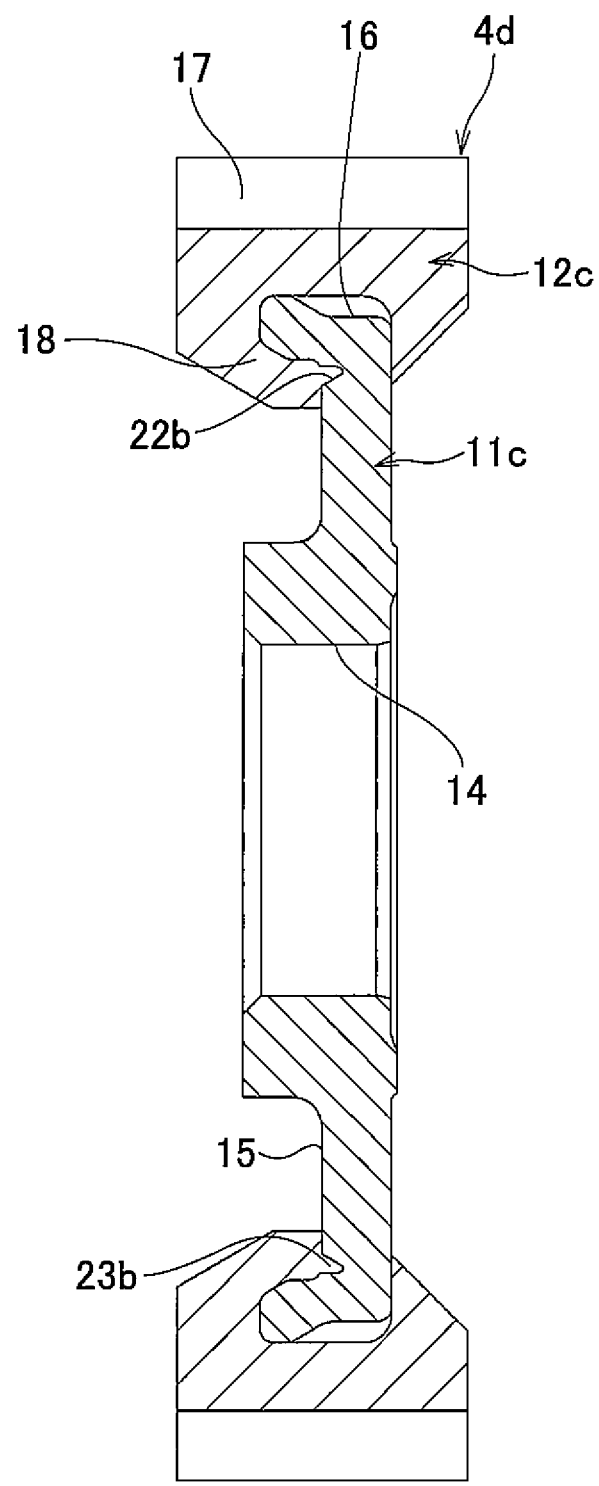
FIG. 6 is a cross-sectional view illustrating a worm wheel of a third example of an embodiment of the present invention.
Figure 7:
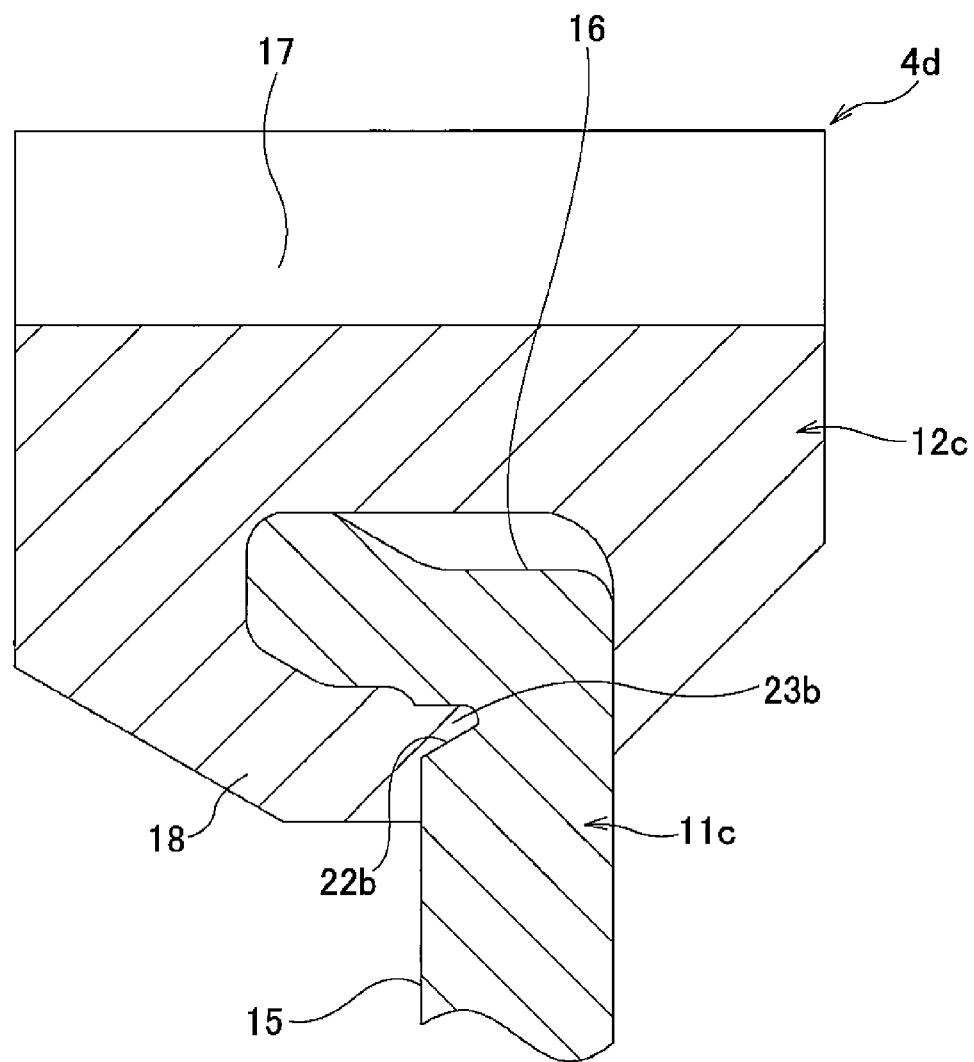
FIG. 7 is an enlarged view illustrating a connecting portion between the hub and gear portion of the worm wheel of the third example.

FIGS. 6 and 7 illustrate a third example of an embodiment of the present invention. In the worm wheel 4*d* of this example, a second annular concave portion (annular concave groove) 22*b* is formed so as to be concave in the axial direction from the bottom surface in the axial direction of the inner surface of a first annular concave portion 15. The construction and functions of the other parts are the same as in the second example.

Fourth Example and Fifth Example

Figure 8:
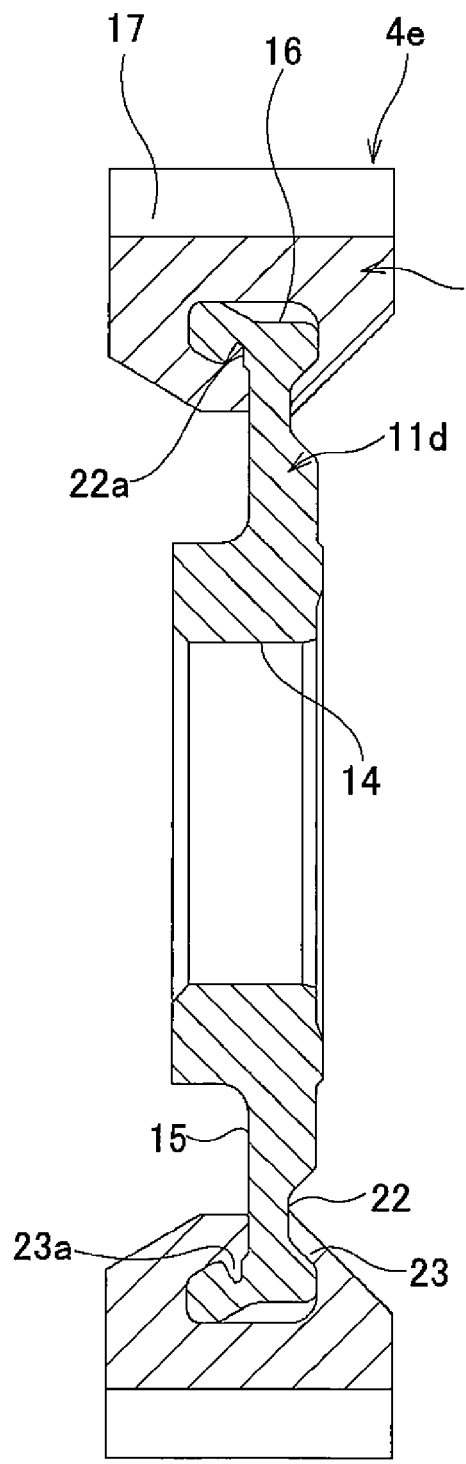
FIG. 8A is a cross-sectional view illustrating a worm wheel of a fourth example of an embodiment of the present invention.
FIG. 8B is a cross-sectional view illustrating a worm wheel of a fifth example of an embodiment of the present invention.
Figure 8:
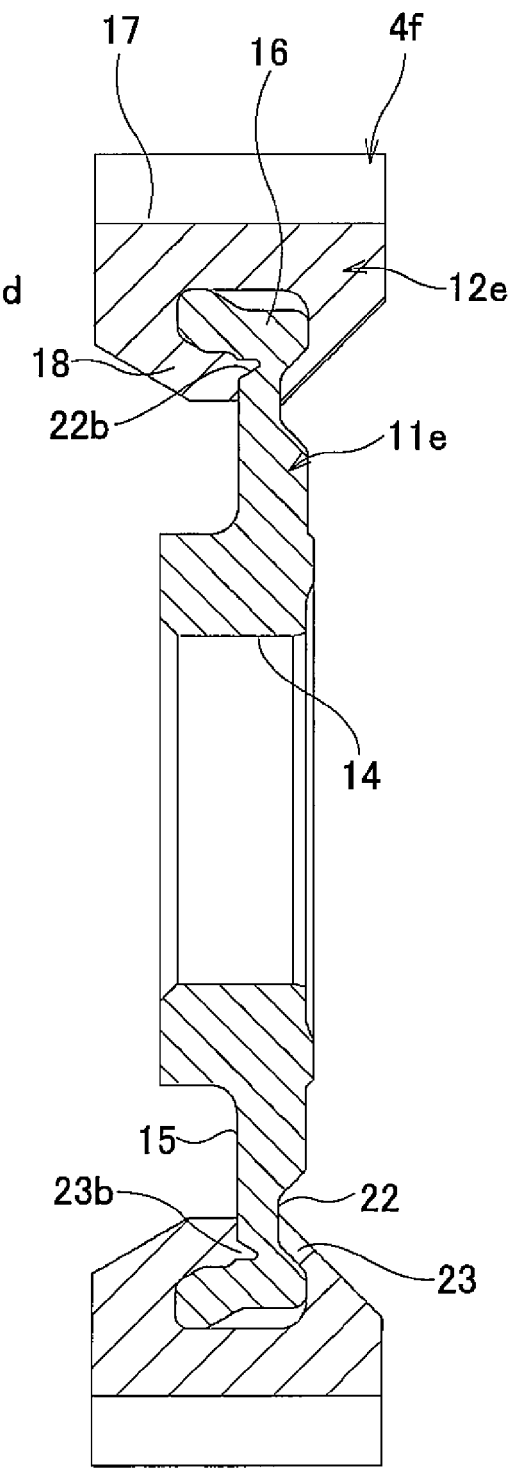
Figure 9:
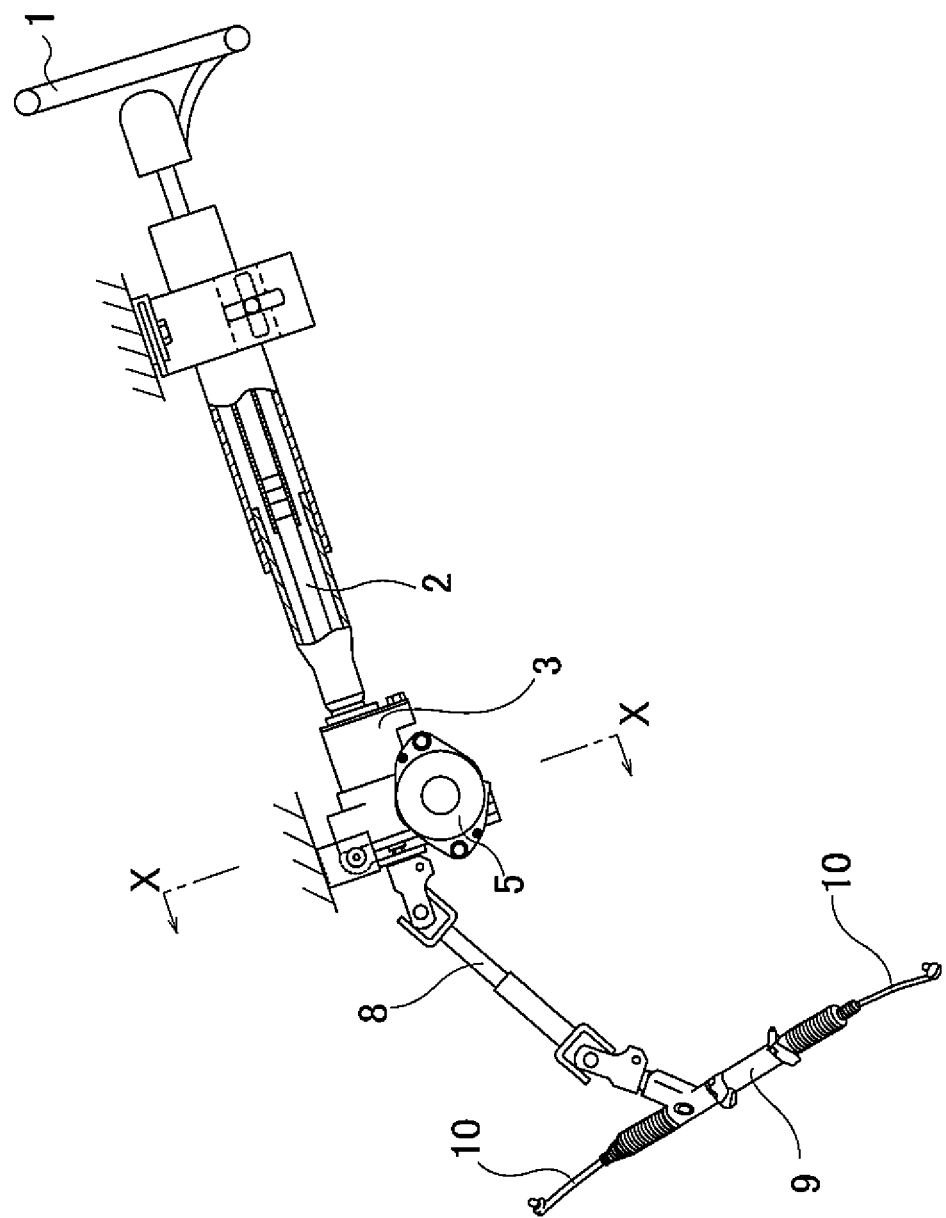
FIG. 9 is a simplified partially cut out side view of a steering apparatus for an automobile in which a conventional electric power steering apparatus is assembled.
Figure 10:
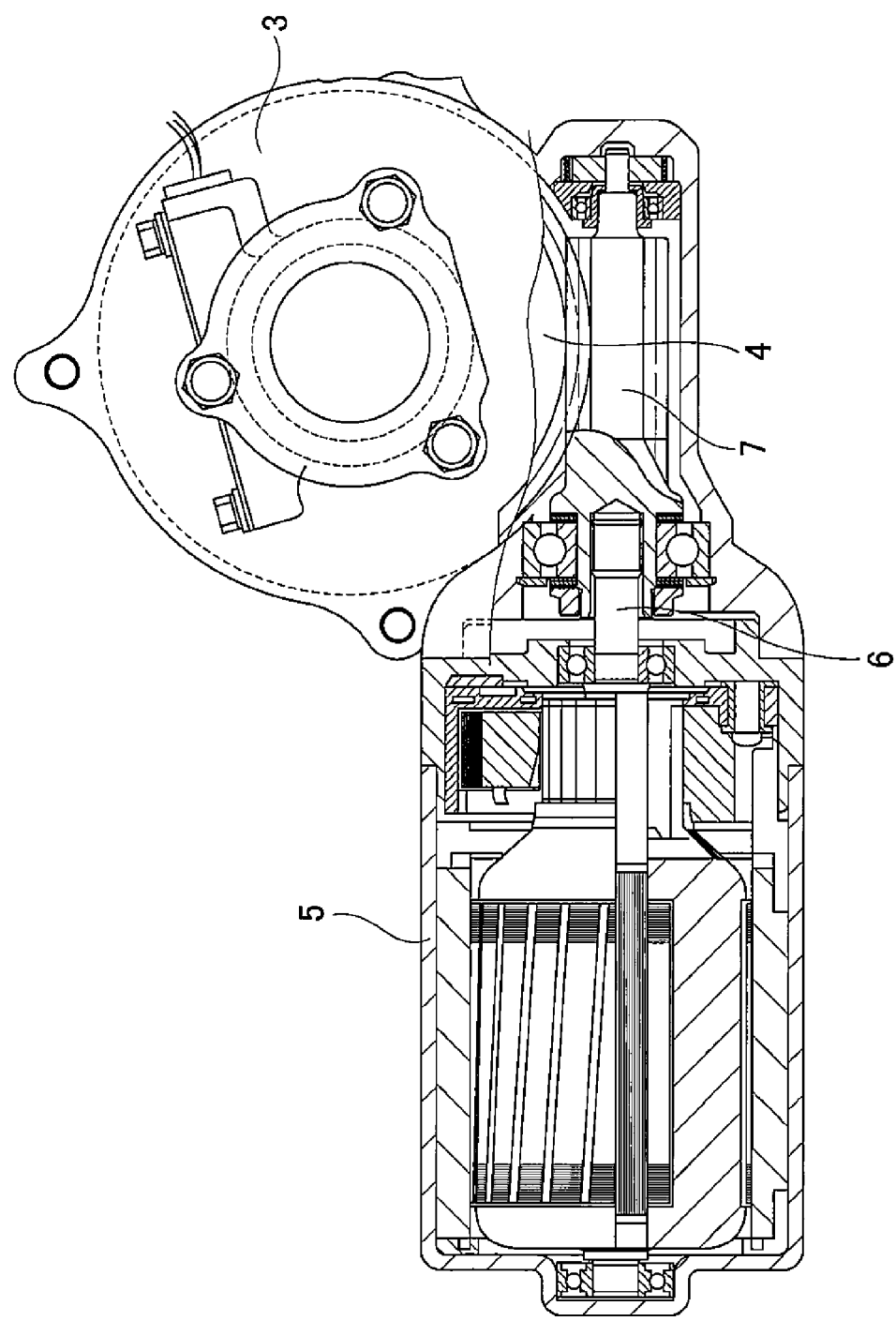
FIG. 10 is an enlarged cross-sectional view of portion X-X in FIG. 9.

FIGS. 8A and 8B illustrate fourth and fifth examples of an embodiment of the present invention. The worm wheel 4*e* of the fourth example illustrated in FIG. 8A has construction that combines the construction of the first example illustrated in FIG. 1 and the construction of the second example illustrated in FIGS. 4 and 5. The worm wheel 4*f* of the fifth example illustrated in FIG. 8B has construction that combines the construction of the first example illustrated in FIG. 1 and the construction of the third example illustrated in FIGS. 6 and 7. In either construction, the strength and rigidity of the connecting portions between the hub 11*d*, 11*e* and the gear portion 12*d*, 12*e* are even further improved. The construction and functions of the other parts are the same as in the first through third examples.

INDUSTRIAL APPLICABILITY

The worm wheel of the present invention can be applied not only to an electric power steering apparatus, but also to a worm speed reducer that is assembled and used in various kinds of mechanical apparatuses.

EXPLANATION OF REFERENCE NUMBERS

1 Steering wheel
2 Steering shaft
3 Housing
4, 4*a*, 4*b*, 4*c*, 4*d*, 4*e*, 4*f* Worm wheel
5 Electric motor
6 Output shaft
7 Worm
8 Intermediate shaft
9 Steering gear unit
10 Tie rod
11, 11*a*, 11*b*, 11*c*, 11*d*, 11*e* Hub
12, 12*a*, 12*b*, 12*c*, 12*d*, 12*e* Gear portion
13 Output shaft
14 Installation hole
15 Annular concave portion (First annular concave portion)
16 Spline portion
17 Worm wheel teeth
18 Restraining portion (First restraining portion)
10 Second restraining portion
20 Torsion bar
21 Torque sensor
22, 22*a* 22*b* Second annular concave portion
23, 23*a*, 23*b* Second restraining portion
24 Mold apparatus
25 Cavity
26 Sprue
27 Disk gate

What is claimed is:
1. A worm wheel comprising:
a metal hub, and
a gear portion formed by a synthetic resin;
the hub comprising:
an installation hole provided in a center portion of the hub, and in which a rotating shaft is fitted and fastened inside;
a first annular concave portion provided in a portion on one surface in an axial direction of the hub;
a second annular concave portion provided in a portion near an outer diameter of the hub; and
concave and convex portions provided in a circumferential direction of the hub around the outer circumferential edge portion of the hub;
wherein the synthetic resin of the gear portion covers an entire circumference of an outer-diameter side end portion of the hub; and
an inner circumferential edge portion of the synthetic resin of the gear portion that is located on the one surface side in the axial direction of the hub fills inside a portion near the outer diameter of the first annular concave portion, and part of the synthetic resin of the gear portion also fills the second annular concave portion.

2. The worm wheel according to claim 1, wherein
the second annular concave portion is formed on an opposite surface in the axial direction of the hub, and a circumferential surface on an inner diameter side and a circumferential surface in the outer-diameter side of the second annular concave portion are inclined surfaces that are inclined in a direction such that a width dimension in a radial direction of the second annular concave portion becomes larger going in a direction toward an opening portion of the opposite surface side in the axial direction of the hub.

3. The worm wheel according to claim 1, wherein
the second annular concave portion is formed so as to be further concave from an inner surface of a portion near the outer diameter of the first annular concave portion.

4. The worm wheel according to claim 3, wherein
the second annular concave portion is formed so as to be concave outward in the radial direction from a circumferential surface on the outer-diameter side of the inner surface of the first annular concave portion.

5. The worm wheel according to claim 3, wherein
the second annular concave portion is formed so as to be concave in the axial direction from a bottom surface in the axial direction of the inner surface of the first annular concave portion.

6. The worm wheel according to claim 3, wherein
the second annular concave portion has a V-shaped cross portion with a width dimension of the second annular concave portion becoming smaller toward a rear portion of the second annular concave portion.

7. An electric power steering apparatus, comprising:
a housing unrotatably supported by a stationary portion;
a rotating shaft provided rotatably with respect to the housing by operation of a steering wheel fixed to the rotating shaft, and applying a steering angle to steered wheels accompanied with rotation of the steering wheel;
a worm wheel supported inside the housing by part of the rotating shaft so as to be concentric with the rotating shaft, and so as to rotate together with the rotating shaft;
a worm comprising a worm shaft and worm teeth provided in a middle portion in an axial direction of the worm shaft, and the worm being rotatably supported by the housing with the worm teeth geared with the worm wheel; and
an electric motor supported by and fastened to the housing to rotate and drive the worm;
wherein the worm comprises
a metal hub, and
a gear portion formed by a synthetic resin;
the hub comprising:
an installation hole provided in a center portion of the hub, and in which a rotating shaft is fitted and fastened inside;
a first annular concave portion provided in a portion on one surface in an axial direction of the hub;
a second annular concave portion provided in a portion near an outer diameter of the hub; and
concave and convex portions provided in a circumferential direction of the hub around the outer circumferential edge portion of the hub;
wherein
the synthetic resin of the gear portion covers an entire circumference of an outer-diameter side end portion of the hub; and
an inner circumferential edge portion of the synthetic resin of the gear portion that is located on the one surface side in the axial direction of the hub fills inside a portion near the outer diameter of the first annular concave portion, and part of the synthetic resin of the gear portion also fills the second annular concave portion.

8. The electric power steering apparatus of claim 7, wherein
the second annular concave portion is formed on an opposite surface in the axial direction of the hub, and a circumferential surface on an inner diameter side and a circumferential surface in the outer-diameter side of the second annular concave portion are inclined surfaces that are inclined in a direction such that a width dimension in a radial direction of the second annular concave portion becomes larger going in a direction toward an opening portion of the opposite surface side in the axial direction of the hub.

9. The electric power steering apparatus of claim 7, wherein
the second annular concave portion is formed so as to be further concave from an inner surface of the portion near the outer diameter of the first annular concave portion.

10. The electric power steering apparatus of claim 7, wherein
the second annular concave portion is formed so as to be concave outward in the radial direction from a circumferential surface on the outer-diameter side of the inner surface of the first annular concave portion.

11. The electric power steering apparatus of claim 9, wherein
the second annular concave portion has a V-shaped cross portion with a width dimension of the second annular concave portion becoming smaller toward a rear portion of the second annular concave portion.

* * * * *